US009794948B2

(12) United States Patent
Sawai

(10) Patent No.: US 9,794,948 B2
(45) Date of Patent: Oct. 17, 2017

(54) COMMUNICATION CONTROL DEVICE, COMMUNICATION CONTROL METHOD, AND BASE STATION

(71) Applicant: SONY CORPORATION, Tokyo (JP)

(72) Inventor: Ryo Sawai, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/166,583

(22) Filed: May 27, 2016

(65) Prior Publication Data
US 2016/0278100 A1    Sep. 22, 2016

Related U.S. Application Data

(63) Continuation of application No. 14/381,285, filed as application No. PCT/JP2013/051862 on Jan. 29, 2013, now Pat. No. 9,374,830.

(30) Foreign Application Priority Data

Mar. 5, 2012 (JP) ................. 2012-047867

(51) Int. Cl.
H04W 72/00 (2009.01)
H04W 72/08 (2009.01)
(Continued)

(52) U.S. Cl.
CPC .............. H04W 72/082 (2013.01); H04L 1/00 (2013.01); H04W 16/32 (2013.01); H04W 24/10 (2013.01);
(Continued)

(58) Field of Classification Search
CPC ................................................ H04W 72/1278
(Continued)

(56) References Cited

U.S. PATENT DOCUMENTS 7,974,629 B2 * 7/2011 Sayers ................ H04L 63/0407
370/231
2011/0151886 A1    6/2011 Grayson et al.
(Continued)

FOREIGN PATENT DOCUMENTS

EP    2180739 A    4/2010
EP    2391168 A    11/2011
(Continued)

OTHER PUBLICATIONS

Office Action for JP Patent Application No. 2016-083743, issued on Feb. 28, 2017, 04 pages of Office Action and 04 pages of English Translation.

(Continued)

Primary Examiner — Qutbuddin Ghulamali
(74) Attorney, Agent, or Firm — Chip Law Group

(57) ABSTRACT

Provided is communication control device including a determination unit which determines whether an access type of a small cell which at least partially overlaps a macro cell of a radio communication system is a closed access type or an open access type, an identification unit which, when it is determined that the access type of the small cell is the closed access type, identifies a user terminal of the macro cell which should be protected from interference caused by a radio signal from the small cell, and an interference control unit which transmits an interference control signal to a base station of the small cell so that the interference on the user terminal identified by the identification unit is reduced.

14 Claims, 11 Drawing Sheets

(51) Int. Cl.

| | | |
|---|---|---|
| *H04W 16/32* | (2009.01) | |
| *H04W 84/10* | (2009.01) | |
| *H04L 1/00* | (2006.01) | |
| *H04W 48/20* | (2009.01) | |
| *H04W 24/10* | (2009.01) | |
| *H04W 28/16* | (2009.01) | |
| *H04W 84/04* | (2009.01) | |

(52) U.S. Cl.
CPC ............ *H04W 48/20* (2013.01); *H04W 84/10* (2013.01); *H04W 28/16* (2013.01); *H04W 84/045* (2013.01)

(58) Field of Classification Search
USPC ...................................................... 455/452.1
See application file for complete search history.

(56) References Cited

U.S. PATENT DOCUMENTS

| | | | |
|---|---|---|---|
| 2011/0244870 A1 | 10/2011 | Lee | |
| 2011/0280223 A1* | 11/2011 | Maeda ................ | H04W 72/082 370/335 |
| 2011/0300892 A1* | 12/2011 | Hakola ............... | H04W 72/085 455/512 |
| 2011/0319084 A1 | 12/2011 | Meshkati et al. | |
| 2012/0015649 A1 | 1/2012 | Li et al. | |
| 2012/0069803 A1* | 3/2012 | Iwamura ........... | H04W 72/1278 370/329 |
| 2013/0210431 A1* | 8/2013 | Abe ................... | H04W 52/244 455/435.1 |

FOREIGN PATENT DOCUMENTS

| | | |
|---|---|---|
| EP | 2393330 A | 12/2011 |
| EP | 2398266 A | 12/2011 |
| JP | 2011-045118 A | 3/2011 |
| JP | 2012-039168 A | 2/2012 |
| JP | 2012-527841 A | 11/2012 |
| WO | 2009-133764 A | 11/2009 |
| WO | 2010-084987 A | 7/2010 |
| WO | 2010-087172 A | 8/2010 |
| WO | 2010-121372 A | 10/2010 |
| WO | 2010/135466 A1 | 11/2010 |
| WO | 2011-017292 A | 9/2011 |
| WO | 2011/162182 A1 | 12/2011 |

OTHER PUBLICATIONS

International Search Report from International Publication No. PCT/JP2013/051862, mailed on Apr. 16, 2013, 3 pages.

Office Action received for Japanese Patent Application No. 2014-503715, mailed on Dec. 22, 2015, 11 pages of Office Action including 5 pages of English translation.

European Search Report from European Patent Application No. 13757960.3, mailed on Jan. 8, 2015, 8 pages.

Office Action for CN Patent Application No. 2013800117910, issued on Jul. 5, 2017, 7 pages Of Office Action and 10 pages of English Translation.

\* cited by examiner

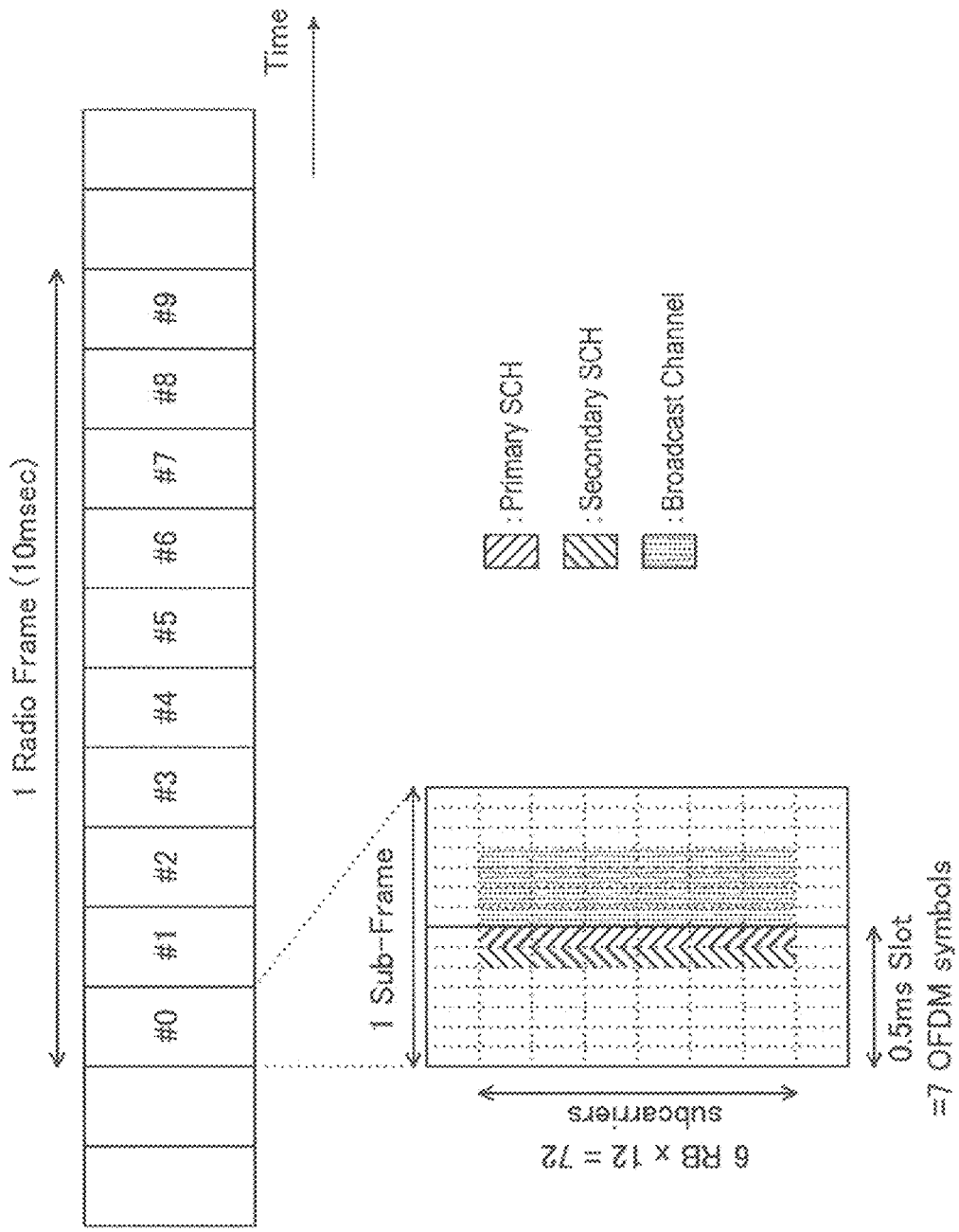

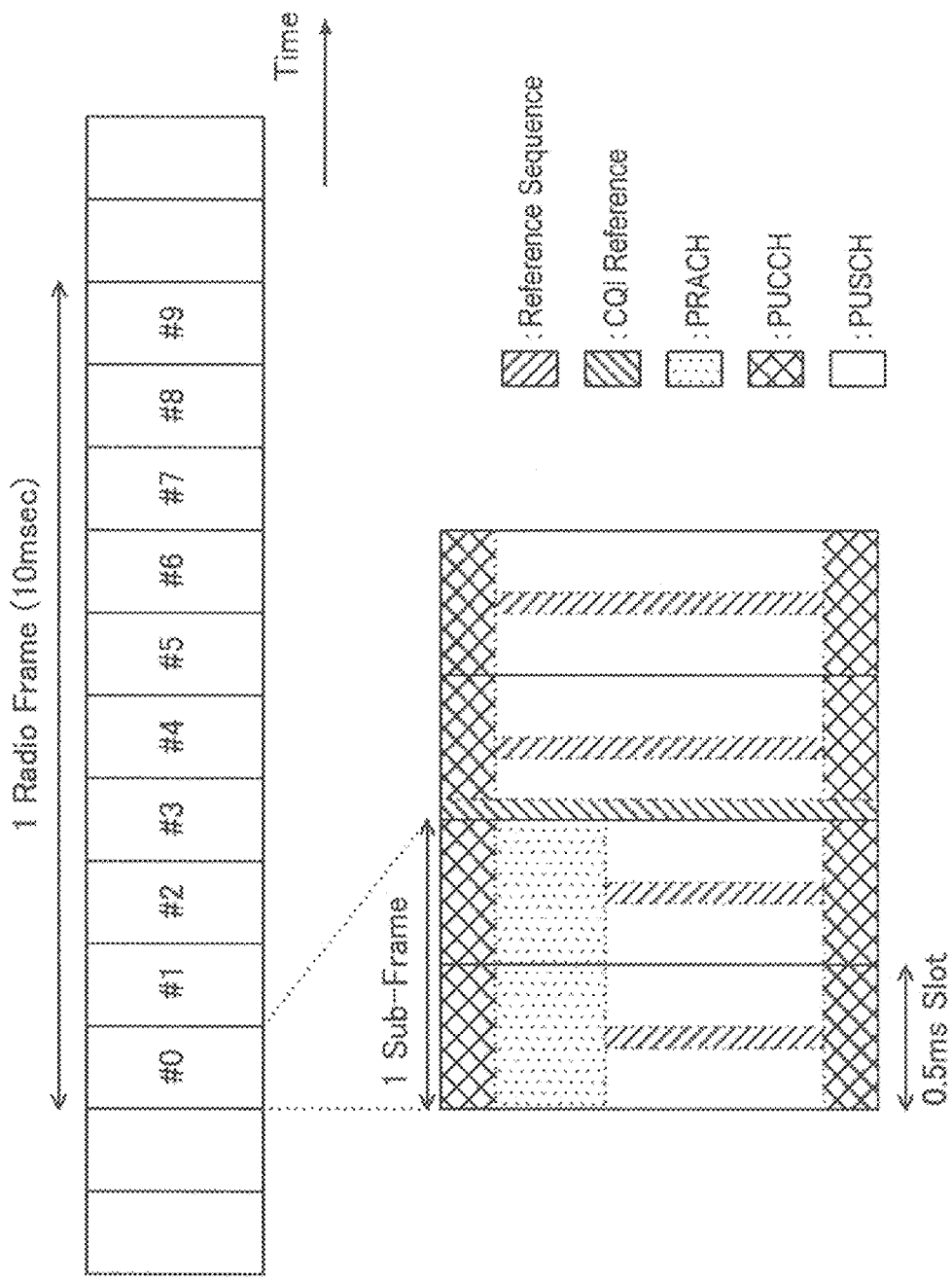

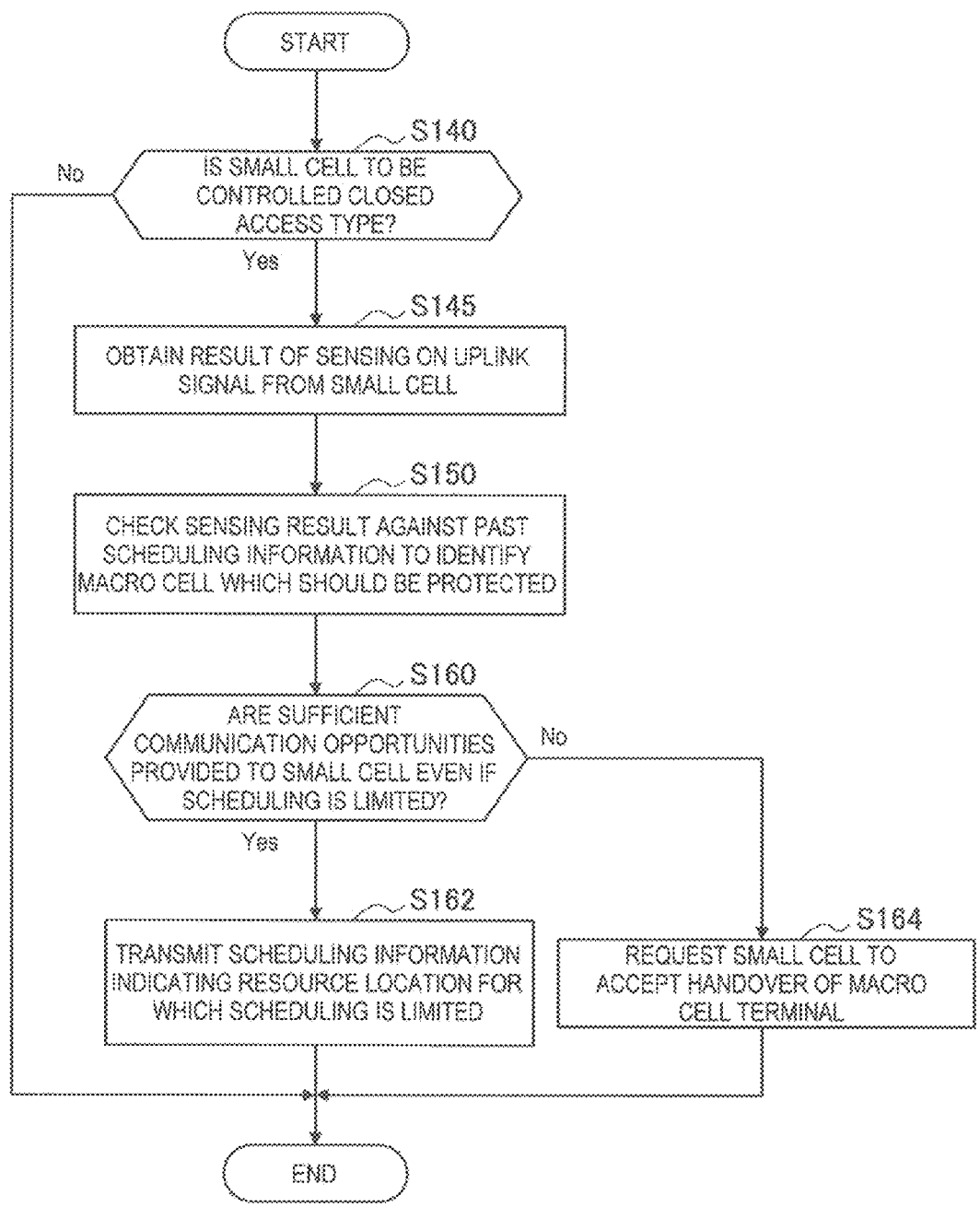

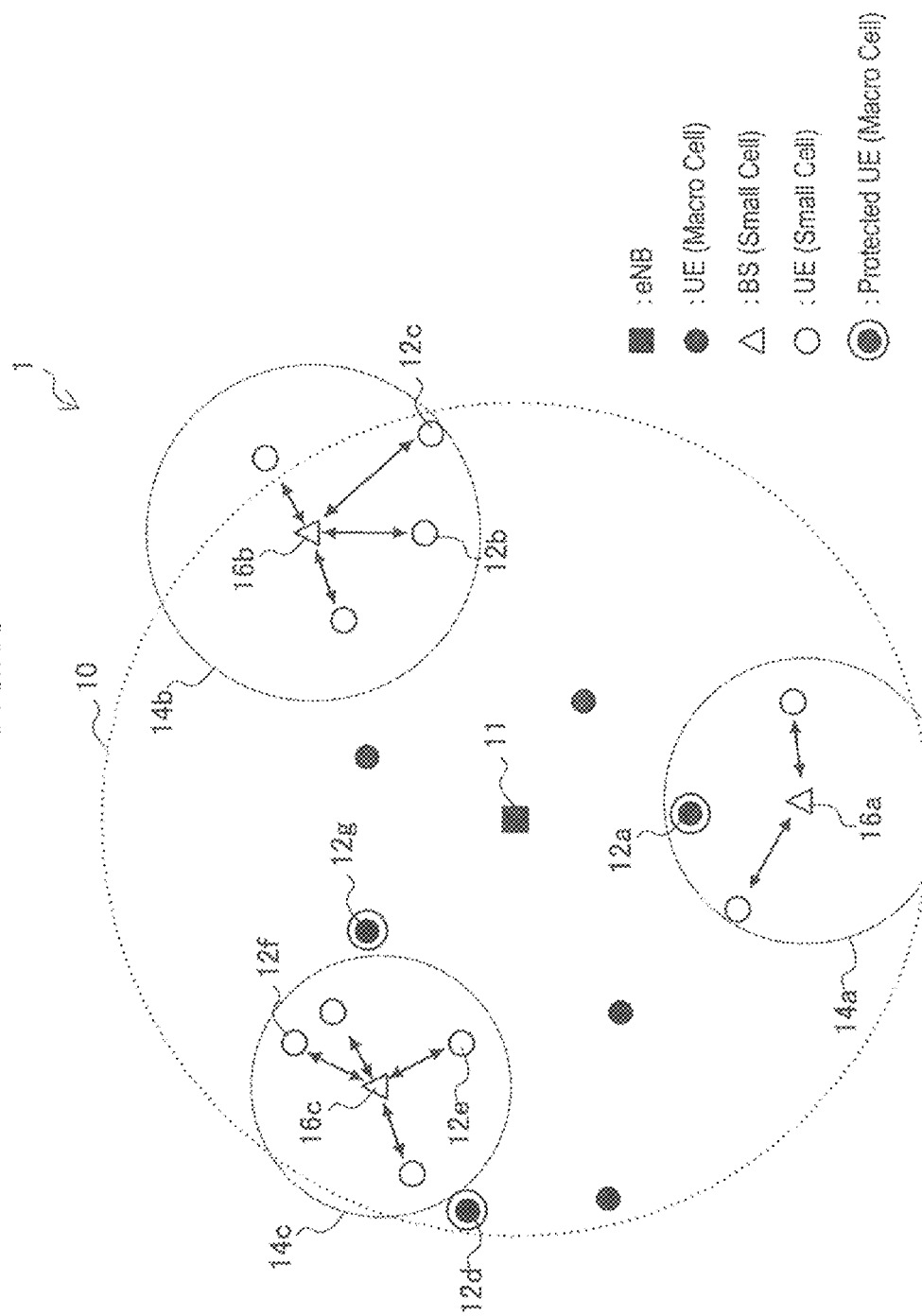

COMMUNICATION CONTROL DEVICE, COMMUNICATION CONTROL METHOD, AND BASE STATION

CROSS-REFERENCE TO RELATED APPLICATIONS

The present application is a continuation application of U.S. patent application Ser. No. 14/381,285, filed Aug. 27, 2014, which is a national phase entry under 35 U.S.C. §371 of International Application No. PCT/JP2013/051862 filed Jan. 29, 2013, published on Sep. 12, 2013 as WO 2013/132920 A1, which claims priority from Japanese Patent Application No. JP 2012-047867, filed in the Japanese Patent Office on Mar. 5, 2012.

TECHNICAL FIELD

The present disclosure relates to communication control devices, communication control methods, and base stations.

BACKGROUND ART

In recent years, it has become practical to use a high-speed cellular radio communication technique, such as LTE (Long Term Evolution), WiMAX, etc., and therefore, the communication rate of radio communications services enjoyable for mobile users has been significantly improved. Moreover, it is expected that the introduction of the fourth-generation cellular radio communication technique, such as LTE-A (LTE-Advanced) etc., would further improve the communication rate.

On the other hand, there has been a rapidly increasing number of mobile users, and therefore, there has been increasing use of applications requiring a high data rate. As a result, the cellular radio communication technique has not yet been developed to meet all needs of mobile users. Therefore, a small cell is beginning to be introduced in order to supplement a macro cell and thereby increase communication capacity. The concept of a small cell encompasses a femtocell, a nanocell, a picocell, a microcell, etc. A small cell is typically introduced by providing a base station (also called an access point) which is smaller than that (e.g., an eNB (evolved Node B) in LTE) of a macro cell. However, in an area where a macro cell and a small cell overlap, there is a risk that a radio signal communicated in the small cell may interfere with a terminal connected to the macro cell.

As a technique for avoiding the risk of interference in the cellular radio communication system, a technique proposed by Patent Literature 1 below is known, for example. According to the technique proposed by Patent Literature 1 below, interference channel information is exchanged between adjacent macro cell base stations, and based on the exchanged interference channel information, transmission power is adjusted by these base stations.

CITATION LIST

Patent Literature

Patent Literature 1: JP 2011-45118A

SUMMARY OF INVENTION

Technical Problem

However, because a small cell has a role in supplementing a macro cell and thereby increasing communication capacity, it is not necessarily appropriate to simply apply an arrangement for performing an interference control between macro cells to an interference control between a macro cell and a small cell. For example, when there is a small cell which interferes with a macro cell terminal, then if the macro cell terminal can be connected to the small cell which is an interference source, to connect the macro cell terminal to the small cell is more beneficial than to reduce the interference by reducing transmission power in terms of overall communication capacity.

Therefore, it is desirable to provide an arrangement which is more suitable for an interference control between a macro cell and a small cell.

Solution to Problem

According to the present disclosure, there is provided a communication control device including a determination unit which determines whether an access type of a small cell which at least partially overlaps a macro cell of a radio communication system is a closed access type or an open access type, an identification unit which, when it is determined that the access type of the small cell is the closed access type, identifies a user terminal of the macro cell which should be protected from interference caused by a radio signal from the small cell, and an interference control unit which transmits an interference control signal to a base station of the small cell so that the interference on the user terminal identified by the identification unit is reduced.

According to another aspect of the present disclosure, there is provided a communication control method including determining whether an access type of a small cell which at least partially overlaps a macro cell of a radio communication system is a closed access type or an open access type, when it is determined that the access type of the small cell is the closed access type, identifying a user terminal of the macro cell which should be protected from interference caused by a radio signal from the small cell, and transmitting an interference control signal to a base station of the small cell so that the interference on the identified user terminal is reduced.

According to another aspect of the present disclosure, there is provided a base station of a small cell of a closed access type, the base station including a control unit which, when the small cell at least partially overlaps a macro cell of a radio communication system, informs a control node which controls interference between the macro cell and the small cell that an access type of the base station is the closed access type, and controls communication in the small cell in accordance with an interference control signal transmitted from the control node in response to the informing to reduce interference on a user terminal of the macro cell which should be protected from interference caused by a radio signal from the small cell.

According to another aspect of the present disclosure, there is provided a communication control method performed by a base station of a small cell of a closed access type, the method including, when the small cell at least partially overlaps a macro cell of a radio communication system, informing a control node which controls interference between the macro cell and the small cell that an access type of the base station is the closed access type, and controlling communication in the small cell in accordance with an interference control signal transmitted from the control node in response to the informing to reduce interference on a user terminal of the macro cell which should be protected from interference caused by a radio signal from the small cell.

Advantageous Effects of Invention

According to the technology of the present disclosure, an arrangement is provided which is more suitable for an interference control between a macro cell and a small cell.

BRIEF DESCRIPTION OF DRAWINGS

FIG. 4 is a diagram for describing an example downlink frame format in LTE.

FIG. 5 is a diagram for describing an example uplink frame format in LTE.

FIG. 9 is a flowchart showing an example flow of an interference control process performed by a cooperation manager according to one embodiment.

FIG. 10 is a diagram for describing an example result of execution of a communication control process according to one embodiment.

DESCRIPTION OF EMBODIMENTS

Hereinafter, preferred embodiments of the present invention will be described in detail with reference to the appended drawings. Note that, in this specification and the drawings, elements that have substantially the same function and structure are denoted with the same reference signs, and repeated explanation is omitted.

Also, the description will be given in the following order.
1. Overview of System
1-1. Example Small Cell
1-2. Location of Cooperation Manager (CM)
2. Configuration of Cooperation Manager
3. Configuration of Small Cell Base Station
4. Flow of Process
4-1. Process of Entire System
4-2. Communication Control Process by Cooperation Manager
5. Summary 1. Overview Of System

Figure 1:
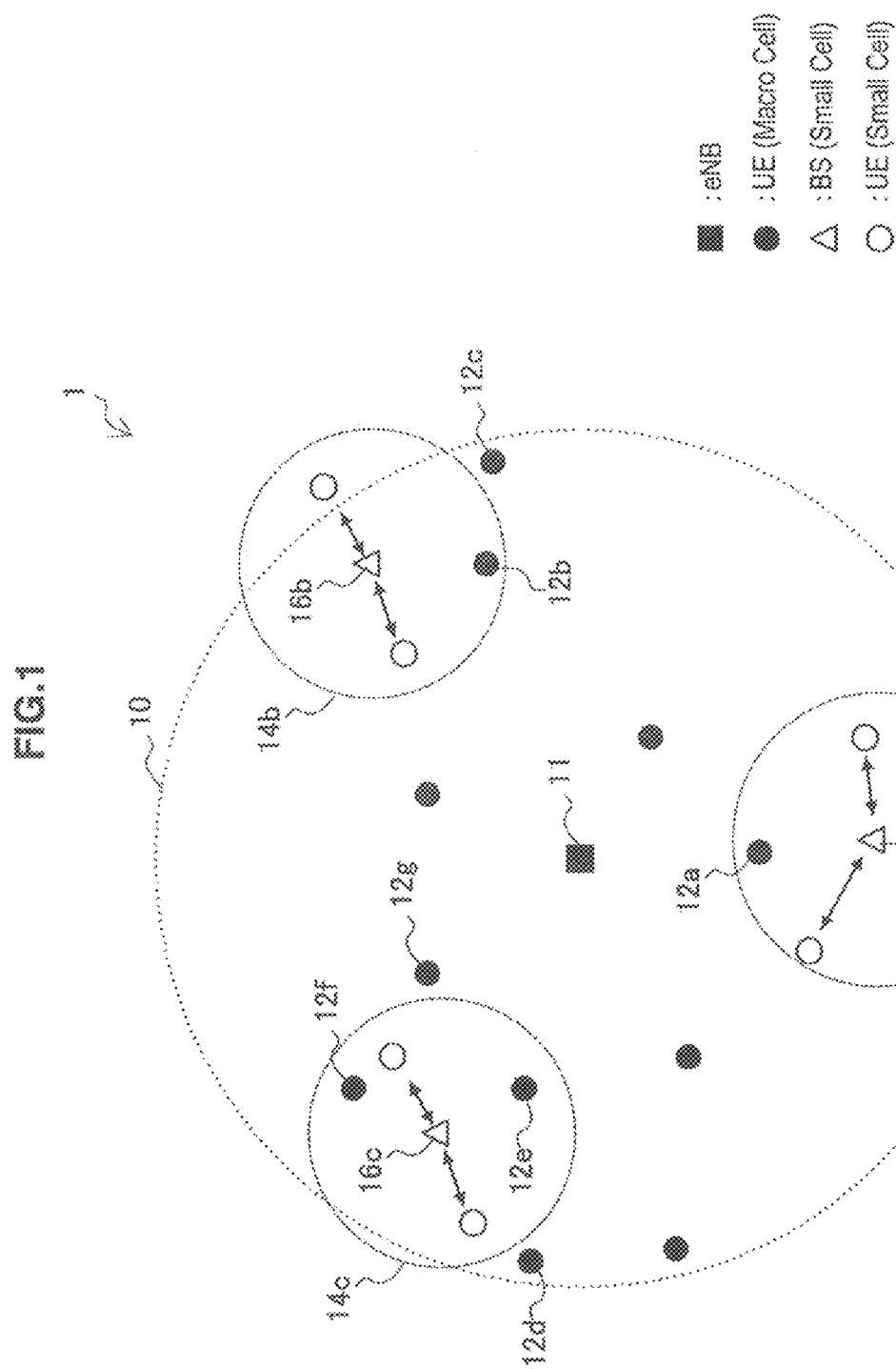
FIG. 1 is a diagram for describing an overview of a system.

[1-1. Example Small Cell]
Firstly, an overview of a system will be described with reference to FIGS. 1 and 2. FIG. 1 shows an example radio communication system 1. The radio communication system 1 may, for example, be a system based on any cellular radio communication scheme, such as LTE, W-CDMA, CDMA2000, WiMAX, LTE-A, etc.

Referring to FIG. 1, a base station 11 (e.g., an eNB in LTE) is shown which provides a radio communications service to a terminal in a macro cell 10. The radius of a macro cell is typically several hundreds of meters to a dozen or so kilometers. However, a problem may occur that, in a space in the vicinity of the boundary of a macro cell, behind a building, underground, indoors, etc., the intensity of a radio signal from a base station of a macro cell decreases, so that communication is not established or the data rate is insufficient. In such a situation, a small cell may be introduced in order to supplement the macro cell and thereby increase communication capacity. As described above, the concept of a small cell includes a femtocell, a nanocell, a picocell, a microcell, etc. A small cell is introduced by providing various types of smaller base stations. Table 1 illustrates several types of small cell base stations.

TABLE 1

Types and Features of Small Cell Base Stations

| Type of base station | IF type | Access type | Place where station is supposed to be provided |
|---|---|---|---|
| RRH (Remote Radio Head) | Type 2 | open | outdoor |
| Hot zone base station | Type 2 | open | outdoor |
| Femtocell base station | Type 1 | closed/open | indoor |
| Relay station | Type 1 | open | outdoor |

In Table 1, the "IF type" refers to categories of interfaces between macro cell base stations. RRHs and hot zone base stations, which have the X2 interface between macro cell base stations, may be categorized into Type 2. Femtocell base stations and relay stations, which do not have the X2 interface, may be categorized into Type 1. The "access type" refers to categories of acceptance of access from an UE. In principle, every user terminal can be connected to a small cell of the open access type. On the other hand, in principle, only limited user terminals can be connected to a small cell of the closed access type. A small cell base station of the closed access type may, for example, store a list of identification information (addresses, device IDs, user IDs, etc.) of user terminals for which connection is acceptable, and based on the list, control access from a user terminal. In the example of Table 1, a small cell which is operated by an RRH, a hot zone base station, and a relay station has the open access type. On the other hand, a small cell which is operated by a femtocell base station has the closed or open access type. Note that the categorization of the access types shown in Table 1 is only for illustrative purposes.

In FIG. 1, small cell base stations 16a, 16B, and 16c are shown. The small cell base stations 16a, 16B, and 16c provide a radio communications service to terminals in small cells 14a, 14b, and 14c, respectively, which at least partially overlap the macro cell 10. In FIG. 1, a terminal connected to a macro cell (hereinafter referred to as a macro cell terminal) is indicated by a closed circle, and a terminal connected to a small cell (hereinafter referred to as a small cell terminal) is indicated by an open circle.

In such a case where a small cell is provided in a macro cell, there is a risk that a radio signal transmitted in the small cell may have interference on a macro cell terminal. In the example of FIG. 1, the macro cell terminal 12a may be interfered with by a radio signal transmitted in the small cell 14a. The macro cell terminals 12b and 12c may be interfered with by a radio signal transmitted in the small cell 14b. Macro cell terminals 12d, 12e, 12f, and 12g may be interfered with a radio signal transmitted from the small cell 14c. Among existing techniques for avoiding these risks of interference is to control transmission power. If the transmission power of a small cell is reduced, the level of interference due to a radio signal transmitted in the small cell is reduced. However, the reduction in transmission power means a reduction in the communication capacity of the small cell. Therefore, in order to maintain or increase the overall communication capacity of a system, it is desirable to control the interference using a different approach if possible instead of reducing transmission power. Therefore, in the technology of the present disclosure, a cooperation manager (CM) described in detail in the following section is introduced.

[1-2. Location of Cooperation Manager (CM)]

Figure 2:
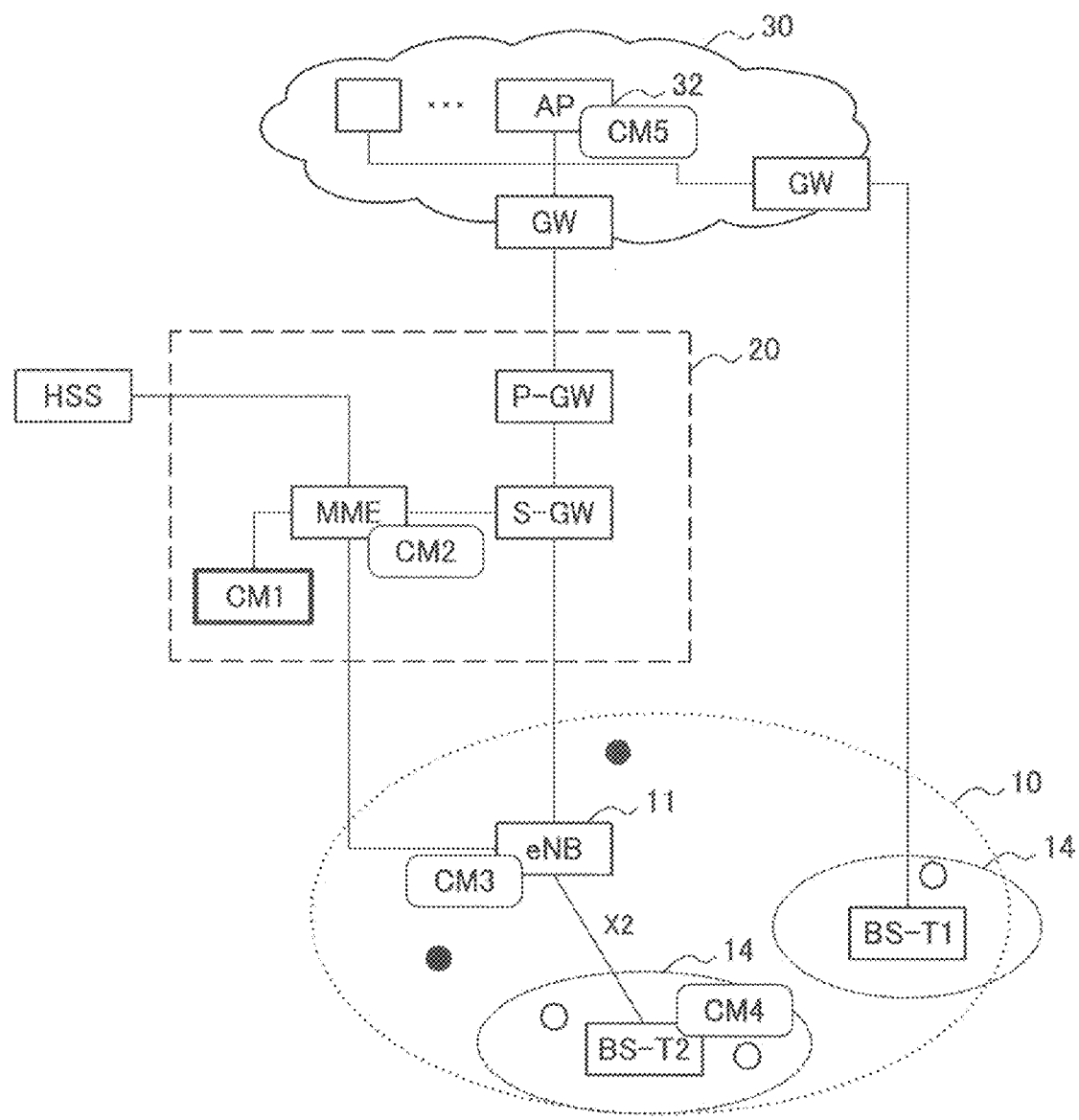
FIG. 2 is a diagram for describing some example locations of a cooperation manager for an interference control.

A cooperation manager may be provided at any communication node that can communicate with a small cell base station. FIG. 2 is a diagram for describing some example locations of a cooperation manager. In FIG. 2, an LTE-based network architecture is shown as an example. In the LTE-based network architecture, a base station (eNB) 11 of a macro cell 10 is connected to a core network 20. The core network 20 is, for example, implemented as an EPC (Evolved Packet Core) including a P-GW, an S-GW, and an MME. The core network 20 is also connected to an external network 30. The external network 30 is an IP (Internet Protocol) network which is also called a PDN (Packet Data Network). Various application (AP) servers may be implemented on the external network 30.

Nodes shown in FIG. 2 have the following respective functions. Although only representative nodes are here shown, other nodes may be included in the network architecture.

HSS (Home Subscriber Server): a server which manages identification information, profile information, authentication information, etc. of subscribers.

MME (Mobility Management Entity): an entity which communicates a NAS (Non Access Stratum) signal to and from an UE to perform mobility management, session management, paging, etc. The entity is connected to a plurality of eNBs.

P-GW (PDN-Gateway): a gateway which is located at a connection point between an EPC and a PDN, and performs assignment of an IP address to an UE, addition and deletion of an IP header, etc. The gateway may also perform charging management.

S-GW (Serving-Gateway): a gateway which is located at a connection point between an E-UTRAN and an EPC, and routes packets in the user plane. When an UE is handed over between eNBs or between UTRANs, an S-GW acts as an anchor point.

eNB (evolved Node B): a base station which provides a radio link in a macro cell, and performs radio resource management (RRM), radio bearer control, scheduling, etc.

In a network architecture, such as that illustrated in FIG. 2, a cooperation manager may be provided as a new control node in the core network 20 (CM1). Also, a cooperation manager may be provided as a new function on an existing control node (e.g., an MME) in the core network 20 (CM2). Also, a cooperation manager may be provided as a new function on a base station (eNB) of a macro cell (CM3). Also, a cooperation manager may be provided as a new function on a small cell base station (CM4). Also, a cooperation manager may be provided as a new server device in the external network 30 (CM5).

In any location, a cooperation manager communicates with a macro cell base station and a small cell base station on a signaling channel including an X2 interface (or other logical/physical interfaces), the core network 20, the external network 30, or the like. Also, the cooperation manager protects a macro cell terminal from interference caused by a radio signal from a small cell while minimizing the reduction in communication capacity as much as possible.

2. Configuration of Cooperation Manager

Figure 3:
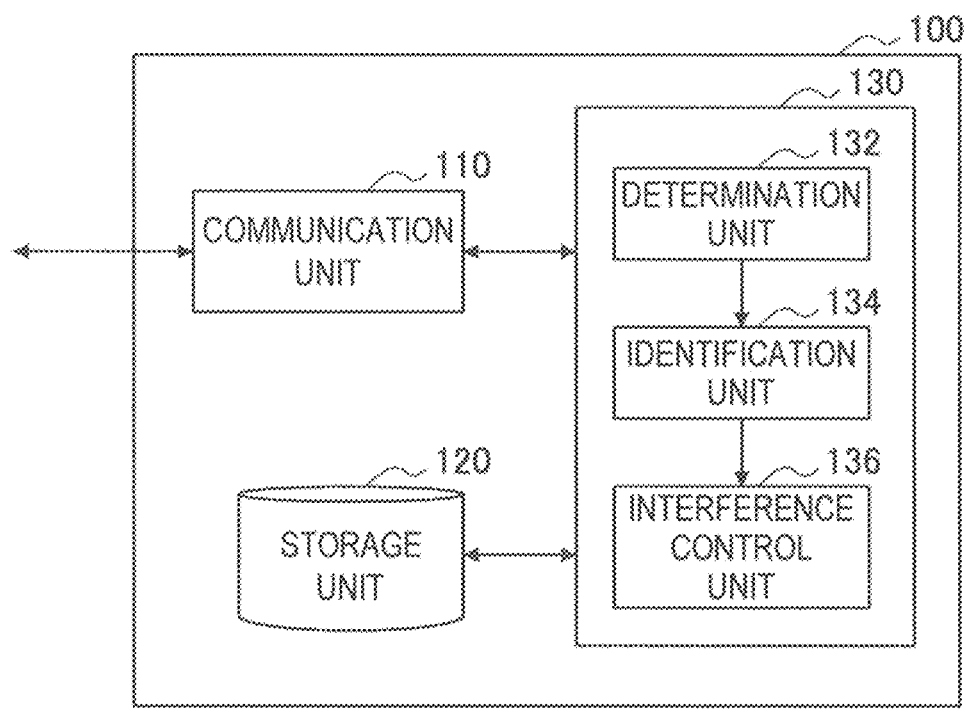
FIG. 3 is a block diagram showing an example configuration of a cooperation manager according to one embodiment.

FIG. 3 is a block diagram showing an example configuration of a cooperation manager 100. Referring to FIG. 3, the cooperation manager 100 includes a communication unit 110, a storage unit 120, and a control unit 130.

(1) Communication Unit

The communication unit 110 is a communication module for allowing the cooperation manager 100 to communicate with another node. The communication unit 110 may include a radio communication module including an antenna and an RF (Radio Frequency) circuit, or a wired communication module, such as a LAN (Local Area Network)-connected terminal etc.

(2) Storage Unit

The storage unit 120 stores a program and data for operating the cooperation manager 100, using a storage medium, such as a hard disk, a semiconductor memory, etc. For example, the storage unit 120 stores small cell-related information received from a small cell base station. The small cell-related information may include, for example, identification information, a location, etc. of a small cell base station. The storage unit 120 may also store scheduling information received from a macro cell base station.

(3) Control Unit

The control unit 130 corresponds to a processor, such as a CPU (Central Processing Unit), a DSP (Digital Signal Processor), etc. The control unit 130 executes a program stored in the storage unit 120 or another storage medium to cause the cooperation manager 100 to perform various functions. In this embodiment, the control unit 130 includes three functional modules, i.e., a determination unit 132, an identification unit 134, and an interference control unit 136.

(3-1) Determination Unit

When a small cell is installed in a macro cell, initial setup of the small cell is performed. In the initial setup procedure (or a subsequent stage), a small cell base station registers small cell-related information into the cooperation manager 100. The determination unit 132, when recognizing a new small cell base station, determines whether the access type of a small cell operated by the small cell base station is the closed access type or the open access type. The determination of the access type may be performed based on access type information which may be directly contained in the small cell-related information, or by querying a database using identification information of the small cell base station as a key.

When the determination unit 132 determines that the access type of the small cell is the open access type, a macro cell terminal which is located in or near the small cell can be connected to the small cell. Therefore, if the level of interference from the small cell exceeds the allowable level, the macro cell terminal changes the connection destination from the macro cell to a small cell of the open access type (i.e., handover), and therefore, can avoid interference and continue the desired communication. On the other hand, when the determination unit 132 determines that the access type of the small cell is the closed access type, connection from a macro cell terminal which is not previously registered to the small cell may be rejected. Therefore, the identification unit 134, described next, identifies a macro cell terminal which is likely to be interfered with by such a small cell of the closed access type.

(3-2) Identification Unit

The identification unit 134, when it is determined that the access type of a small cell is the closed access type, identifies a macro cell terminal which should be protected from interference caused by a radio signal from the small cell. More specifically, in this embodiment, the identification unit 134 identifies a macro cell terminal which should be protected, based on the result of sensing received from a small cell base station. Here, sensing typically refers to measurement of a signal level of an uplink signal from a user terminal which is located around a small cell (e.g., in or near a small cell). A small cell base station may voluntarily perform sensing. Instead, the identification unit 134 may request a small cell base station to perform sensing.

The sensing result provided from the small cell base station may, for example, indicate whether or not an uplink signal exceeding a predetermined level has been detected ("1" when such an uplink signal has been detected, or "0" otherwise, etc.) on a resource block-by-resource block basis or in groups of a plurality of resource blocks. Instead, the sensing result may indicate the signal level of the detected uplink signal on a resource block-by-resource block basis or in groups of a plurality of resource blocks. Moreover, the identification unit 134 obtains scheduling information of a macro cell from a macro cell base station (or other control nodes). The scheduling information indicates what macro cell terminal has transmitted an uplink signal using what resource block. Thereafter, the identification unit 134 checks the sensing result obtained from the small cell base station against the scheduling information of the macro cell, to identify a macro cell terminal which should be protected. For example, a macro cell terminal which has been given an uplink grant (UL Grant) with respect to a resource block for which an uplink signal exceeding the predetermined level has been detected (i.e., for which scheduling has been performed) may be identified as a target which should be protected.

The identification unit 134 outputs, to the interference control unit 136, identification information of a macro cell terminal thus identified as a protection target, and identification information of a corresponding small cell base station.

(3-3) Interference Control Unit

In order to reduce interference on a macro cell terminal identified by the identification unit 134, the interference control unit 136 controls interference caused by a radio signal from a corresponding small cell. For example, the interference control unit 136 transmits scheduling information of a macro cell to a small cell base station so that radio resources different from those allocated for a macro cell terminal which should be protected are used in the small cell.

FIG. 4 is a diagram for describing an example downlink frame format in LTE. In an upper portion of FIG. 4, one radio frame having a length of 10 msec is shown. One radio frame includes ten sub-frames each having a length of 1 msec. One sub-frame includes two 0.5-ms slots. One 0.5-ms slot typically includes seven (six when extended cyclic prefixes are used) OFDM symbols in the time direction. Also, one OFDM symbol and twelve sub-carriers in the frequency direction form one resource block. Of such time-frequency resources, resources at a predetermined location are used for control signaling. For example, in some resource blocks located at a middle of the band, a primary synchronization channel, a secondary synchronization channel, and a broadcast channel are provided. The primary synchronization channel and the secondary synchronization channel are used for cell search and synchronization. The broadcast channel is used to broadcast system information, such as a system bandwidth, a MIMO antenna configuration, etc. The other resource blocks may be used for downlink data transmission.

FIG. 5 is a diagram for describing an example uplink frame format in LTE. Also in an uplink, one radio frame includes ten sub-frames each having a length of 1 msec. Of uplink resources, resources at a predetermined location are used for control signaling. For example, a reference sequence for demodulation of an uplink signal is provided at a middle in the time direction of each 0.5-ms slot. A reference sequence for CQI measurement may be provided at a head of the second sub-frame (#1). A random access channel (PRACH) is used for random access from a user terminal. A physical uplink shared channel (PUSCH) may be used for uplink data transmission.

Allocation of resources to downlink data transmission to a macro cell terminal and uplink data transmission to a macro cell terminal is determined by a macro cell base station. Thereafter, the macro cell base station broadcasts scheduling information indicating resource allocation to the macro cell terminal. Moreover, in this embodiment, a macro cell base station also provides the scheduling information to the cooperation manager 100. For example, the interference control unit 136 may filter information about a resource block in which a macro cell terminal which should be protected is involved, from scheduling information provided from a macro cell base station, and transmit the filtered scheduling information to a small cell base station.

Figure 6A:
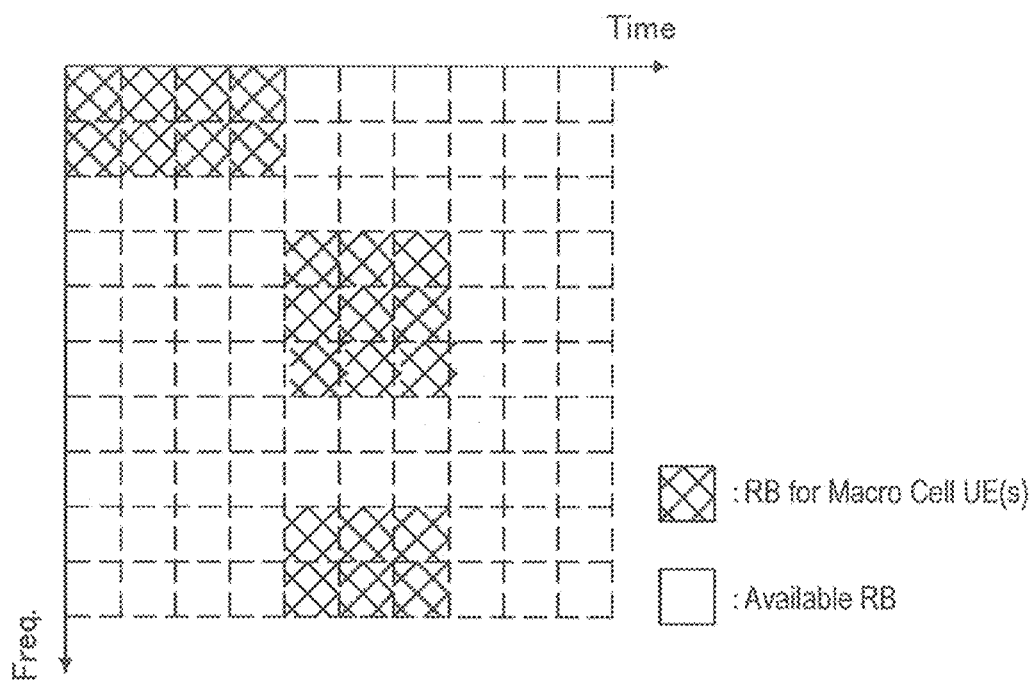
FIG. 6A is a diagram for describing first example scheduling information which is transmitted to a small cell base station.

FIG. 6A is a diagram for describing first example scheduling information which is transmitted from the interference control unit 136 to a small cell base station. In the example of FIG. 6A, it is assumed that each square on the time-frequency plane corresponds to a resource block (RB). Hatched squares are resource blocks allocated to a macro cell terminal which should be protected. Non-hatched squares are resource blocks which can be used by a small cell. Scheduling information transmitted from the interference control unit 136 to a small cell base station may be information, such as a bitmap, which distinguishes resource blocks the use of which is restricted for a small cell from resource blocks which a small cell is allowed to use.

Also, the interference control unit 136 may, for example, transmit, to a small cell base station, scheduling information which indicates resource blocks used by a neighboring small cell in addition to resource blocks in which a macro cell terminal which should be protected is involved.

Figure 6B:
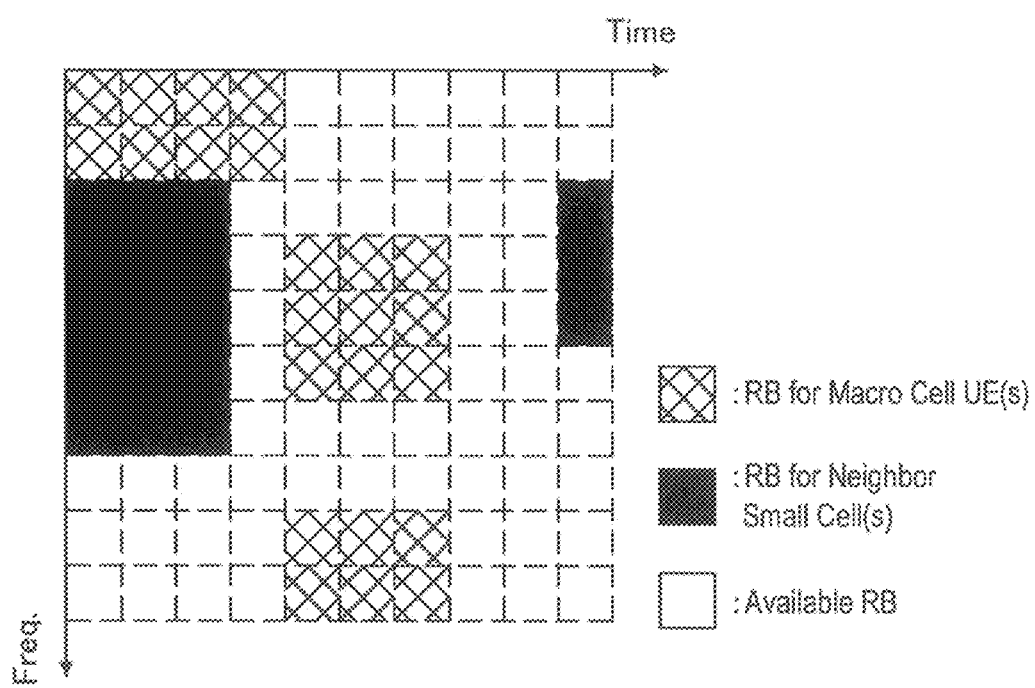
FIG. 6B is a diagram for describing second example scheduling information which is transmitted to a small cell base station.

FIG. 6B is a diagram for describing second example scheduling information which is transmitted from the interference control unit 136 to a small cell base station. In the example of FIG. 6B, closed squares are resource blocks which are used by a small cell located in the vicinity of a small cell base station which receives the scheduling information. By providing such scheduling information, scheduling of a plurality of neighboring small cells can be controlled so that interference between these small cells is reduced.

A small cell base station which has received the scheduling information illustrated in FIG. 6A or 6B controls communication in the small cell so that only a resource block(s) which the scheduling information indicates can be used is used by a small cell terminal. Note that when there are a large number of macro cell terminals, or when there is a macro cell terminal(s) which consumes a large number of resource blocks, it may in some cases be difficult to provide sufficient communication opportunities in a small cell while appropriately reducing interference on a macro cell terminal. Therefore, the interference control unit 136 may, for example, request a small cell base station to accept a handover of at least one macro cell terminal to a small cell, based on the number of macro cell terminals which should be protected or the proportion of radio resources which are used by the macro cell terminals. In this case, the handover acceptance request transmitted from the interference control unit 136 may include identification information of a macro cell terminal which is to be handed over. A small cell base station of the closed access type, when receiving such a request, adds identification information of the macro cell terminal to a list of user terminals which accept connection, and waits for a handover from the terminal.

A macro cell terminal may move after the interference control of the cooperation manager 100 has begun. Therefore, it is desirable that a small cell base station continue to perform sensing on the surroundings. For example, when a macro cell terminal which should be protected has moved far from a small cell, the limitation on scheduling is no longer required, and therefore, resources available in the small cell increase. However, to continue to perform sensing on all resource blocks in which an uplink signal may be transmitted is a great load on a small cell base station and a small cell terminal. Therefore, the interference control unit 136 may, for example, inform a small cell base station of a location (at least one of a timing and a frequency) of resources on which an uplink signal is transmitted by a macro cell terminal which should be protected. Here, for example, an uplink signal may include an acknowledge signal (ACK) with respect to a downlink signal. In general, a terminal which has received a downlink signal is supposed to return an ACK (or an NACK) within a predetermined period of time (e.g., 8 msec). Therefore, by narrowing locations of resources on which an uplink signal is transmitted based on the period of time, the load of sensing on a small cell can be reduced. Also, the uplink signal may include a signal which carries a CQI (Channel Quality Indicator) on a PUSCH. In particular, when a terminal downloads a file having a large data size, or when a terminal receives streaming data, transmission of an uplink signal from the terminal is only performed at a considerably low frequency compared to reception of a downlink signal. Therefore, it is useful to inform a small cell base station of locations of resources on which an uplink signal is transmitted to allow the small cell base station to narrow resource locations at which sensing should be performed. Also, the uplink signal may be an authentication signal which is used when a macro cell terminal which should be protected uses a broadcast service (e.g., a signal transmitted for the purpose of handshake or charging). A broadcast service is, for example, provided by using an MBMS (Multimedia Broadcast Multicast Service) frame. A terminal which receives a signal on an MBMS frame does not return an ACK. Therefore, by perform sensing on the above authentication signal instead of an ACK signal, the movement of a macro cell terminal can be detected with a small sensing load.

3. Configuration of Small Cell Base Station

Figure 7:
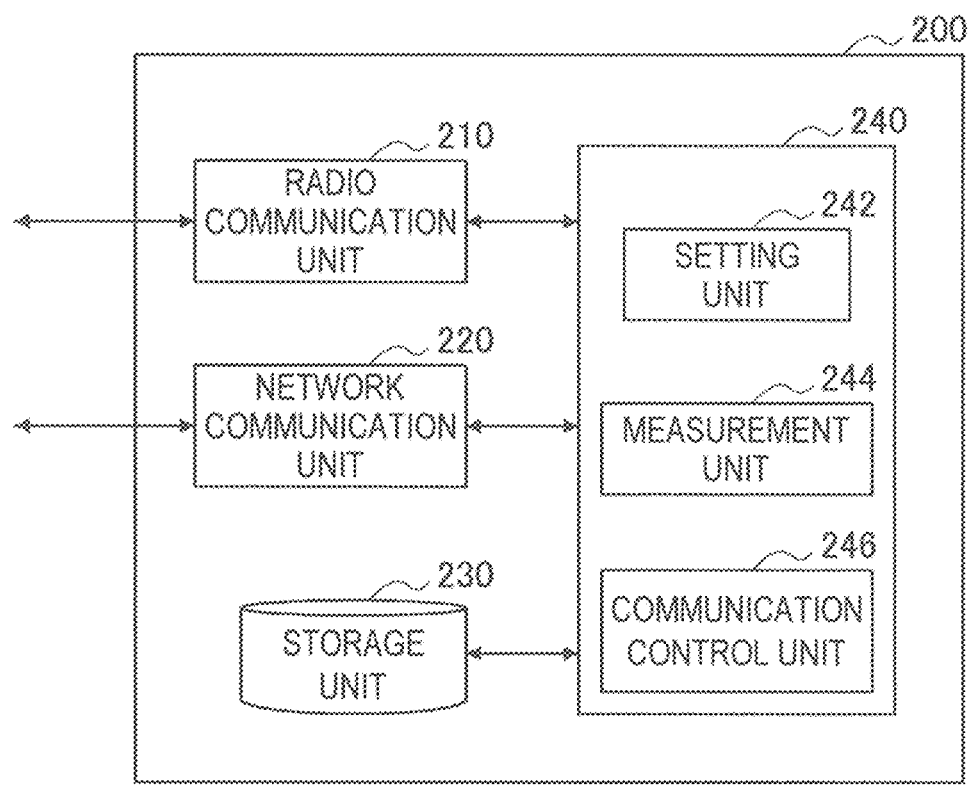
FIG. 7 is a block diagram showing an example configuration of a small cell base station according to one embodiment.

A small cell base station 200 and the above cooperation manager 100 form a communication control system. FIG. 7 is a block diagram showing an example configuration of the small cell base station 200 according to one embodiment. Referring to FIG. 7, the small cell base station 200 includes a radio communication unit 210, a network communication unit 220, a storage unit 230, and a control unit 240.

(1) Radio Communication Unit

The radio communication unit 210 is a radio communication module for providing a radio communications service to a small cell terminal. The radio communication unit 210 includes an antenna and an RF circuit. The radio communication unit 210 communicates a radio signal to and from one or more small cell terminals in accordance with scheduling by a communication control unit 246 described below.

(2) Network Communication Unit

The network communication unit 220 is a communication module for communication between the small cell base station 200 and a control node, such as the cooperation manager 100 etc. The network communication unit 220 may include a radio communication module which may be shared by the radio communication unit 210, or a wired communication module, such as a LAN-connected terminal etc.

(3) Storage Unit

The storage unit 230 stores a program and data for operating the small cell base station 200, using a storage medium, such as a hard disk, a semiconductor memory, etc. For example, when the access type of a small cell operated by the small cell base station 200 is the closed access type, the storage unit 230 previously stores a list of identification information of user terminals which accept connection. The storage unit 230 may also store scheduling information of a macro cell (and a neighboring small cell) provided from the cooperation manager 100.

The control unit 240 corresponds to a processor, such as a CPU, a DSP, etc. The control unit 240 executes a program stored in the storage unit 230 or another storage medium to cause the small cell base station 200 to perform various functions. In this embodiment, the control unit 240 includes three functional modules, i.e., a setting unit 242, a measurement unit 244, and a communication control unit 246.

(4-1) Setting Unit

The setting unit 242 sets up a radio communications service operated by the small cell base station 200. For example, the setting unit 242, when the small cell base station 200 has been installed in a macro cell, searches for a cooperation manager 100, and transmits small cell-related information to the detected cooperation manager 100. The small cell-related information may, for example, include access type information indicating the access type of the small cell. When the access type of the small cell is the closed access type, the communication control unit 246 described below reduces interference on a macro cell terminal under the control of the cooperation manager 100.

(4-2) Measurement Unit

The measurement unit 244 performs sensing on an uplink signal from a user terminal around a small cell. The measurement unit 244 may voluntarily perform sensing after the initial setup of a small cell has been completed by the setting unit 242. Instead, the measurement unit 244 may perform sensing in response to a request from the cooperation manager 100. Also, the measurement unit 244 may request a small cell terminal connected to the small cell base station 200 to perform sensing in addition to (or instead of) performing sensing on its own. The result of sensing is collected and transmitted by the measurement unit 244 to the cooperation manager 100.

The measurement unit 244 continues to perform sensing on an uplink signal from a user terminal around a small cell even after the interference control of the cooperation manager 100 has begun. Sensing for detecting movement of a macro cell terminal which has already been identified as a target to be protected may be performed only at a resource location(s) recommended (narrowed) by the cooperation manager 100. On the other hand, sensing for detecting appearance of a new macro cell terminal which should be protected may be performed at a relatively low frequency, within a wider target range of resource locations.

(4-3) Communication Control Unit

The communication control unit 246 controls radio communication between the small cell base station 200 and a small cell terminal. For example, the communication control unit 246 broadcasts a synchronization signal for cell search and synchronization, and system information, in accordance with a setting by the setting unit 242. The communication control unit 246 also allocates a resource block on a data channel to each small cell terminal. Thereafter, the communication control unit 246 causes the radio communication unit 210 to receive an uplink signal and transmit a downlink signal in accordance with the allocation. When the access type of a small cell is the closed access type, the communication control unit 246 accepts or rejects access from a user terminal using a previously stored list of user terminals.

The communication control unit 246, when receiving an interference control signal from the cooperation manager 100, reduces interference on a macro cell terminal in accordance with the received interference control signal. For example, the interference control signal includes scheduling information indicating radio resources allocated to a macro cell terminal which should be protected. In this case, the communication control unit 246 allocates, to a small cell terminal, radio resources which are different from those indicated by the scheduling information. Such a simple resource separation scheme can appropriately protect a macro cell terminal which may be interfered with by the small cell even when the small cell base station 200 does not detect the identification information, location, etc. of a macro cell terminal. When radio resources used in a neighboring small cell are also indicated in the scheduling information, the communication control unit 246 may remove the radio resources from those to be allocated.

Also, when the cooperation manager 100 requests the communication control unit 246 to accept connection (i.e., a handover) of a specific macro cell terminal to a cell to which the communication control unit 246 belongs, the communication control unit 246 adds the macro cell terminal to a list of allowable user terminals. As a result, the macro cell terminal is allowed to be handed over from a macro cell to a small cell (a cell to which the small cell base station 200 belongs). Note that the communication control unit 246 may reject a handover acceptance request from the cooperation manager 100 when some condition (e.g., conditions related to a quality requirement, a location, a device type, etc.) is not satisfied.

4. Flow pf Process

[4-1. Process of Entire System]

(1) First Example

Figure 8A:
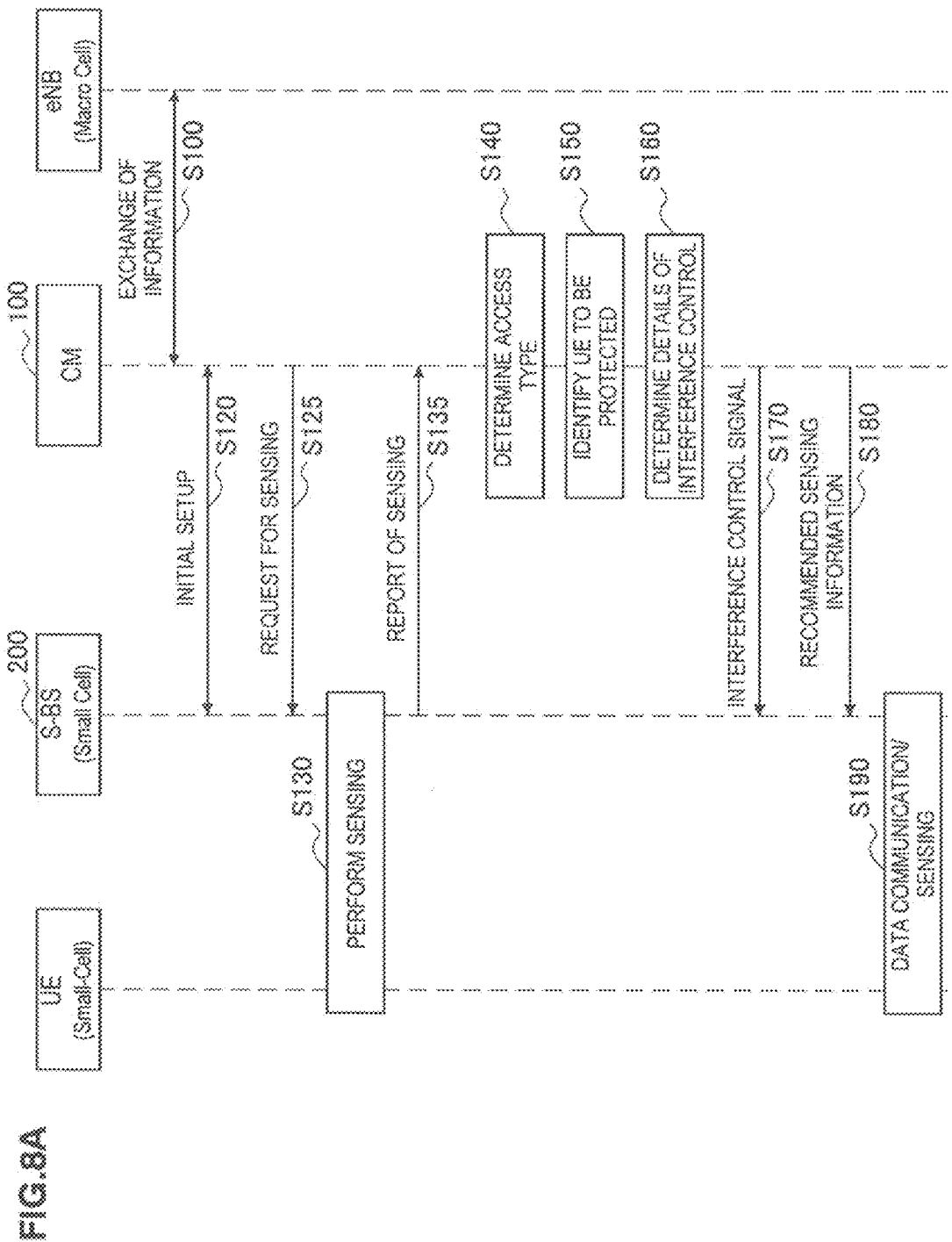
FIG. 8A is a sequence diagram showing a first example general flow of a communication control process according to one embodiment.

FIG. 8A is a sequence diagram showing a first example general flow of a communication control process according to this embodiment. In the communication control process of FIG. 8A, the cooperation manager 100, the small cell base station 200, a small cell terminal (UE), and a macro cell base station (eNB) are involved.

Initially, the cooperation manager 100 exchanges information with one or more macro cell base stations periodically or as requested (step S100). Here, the exchanged information may include scheduling information of a macro cell.

Next, when the small cell base station 200 is installed in any macro cell, an initial setup procedure is performed between the small cell base station 200 and the cooperation manager 100 (step S120). In the initial setup procedure, the setting unit 242 of the small cell base station 200 transmits small cell-related information which may include access type information to the cooperation manager 100 (step S120).

In the example of FIG. 8A, next, a sensing request is transmitted from the cooperation manager 100 to the small cell base station 200 (step S125). In response to this, the small cell base station 200 (and a small cell terminal) performs sensing on an uplink signal from a user terminal around a small cell (step S130). Thereafter, the measurement unit 244 of the small cell base station 200 reports the result of the sensing to the cooperation manager 100 (step S135).

Next, the determination unit 132 of the cooperation manager 100 determines whether the access type of a small cell operated by the small cell base station 200 is the closed access type or the open access type (step S140). Also, the identification unit 134, when it is determined that the access type is the closed access type, checks the reported sensing result against scheduling information provided from a macro cell base station, to identify a macro cell terminal which should be protected (step S150). Thereafter, the interference control unit 136 determines details of a control for reducing interference from a small cell on the identified macro cell terminal (step S160). Note that an interference control process of the cooperation manager 100 corresponding to steps S140 to S160 described here will be described in greater detail below.

Next, the cooperation manager 100 transmits an interference control signal to the small cell base station 200 in accordance with the details of the control determined in step S160 (step S170). Here, the transmitted interference control signal may, for example, include scheduling information or a handover acceptance request for a macro cell terminal which should be protected. Moreover, the cooperation manager 100 may transmit, to the small cell base station 200, recommended sensing information indicating the location of resources on which the small cell base station 200 should perform sensing (step S180).

Thereafter, data is communicated between the small cell base station 200 and one or more small cell terminals under the control of the communication control unit 246 of the small cell base station 200, and continual sensing is performed (step S190).

(2) Second Example

Figure 8B:
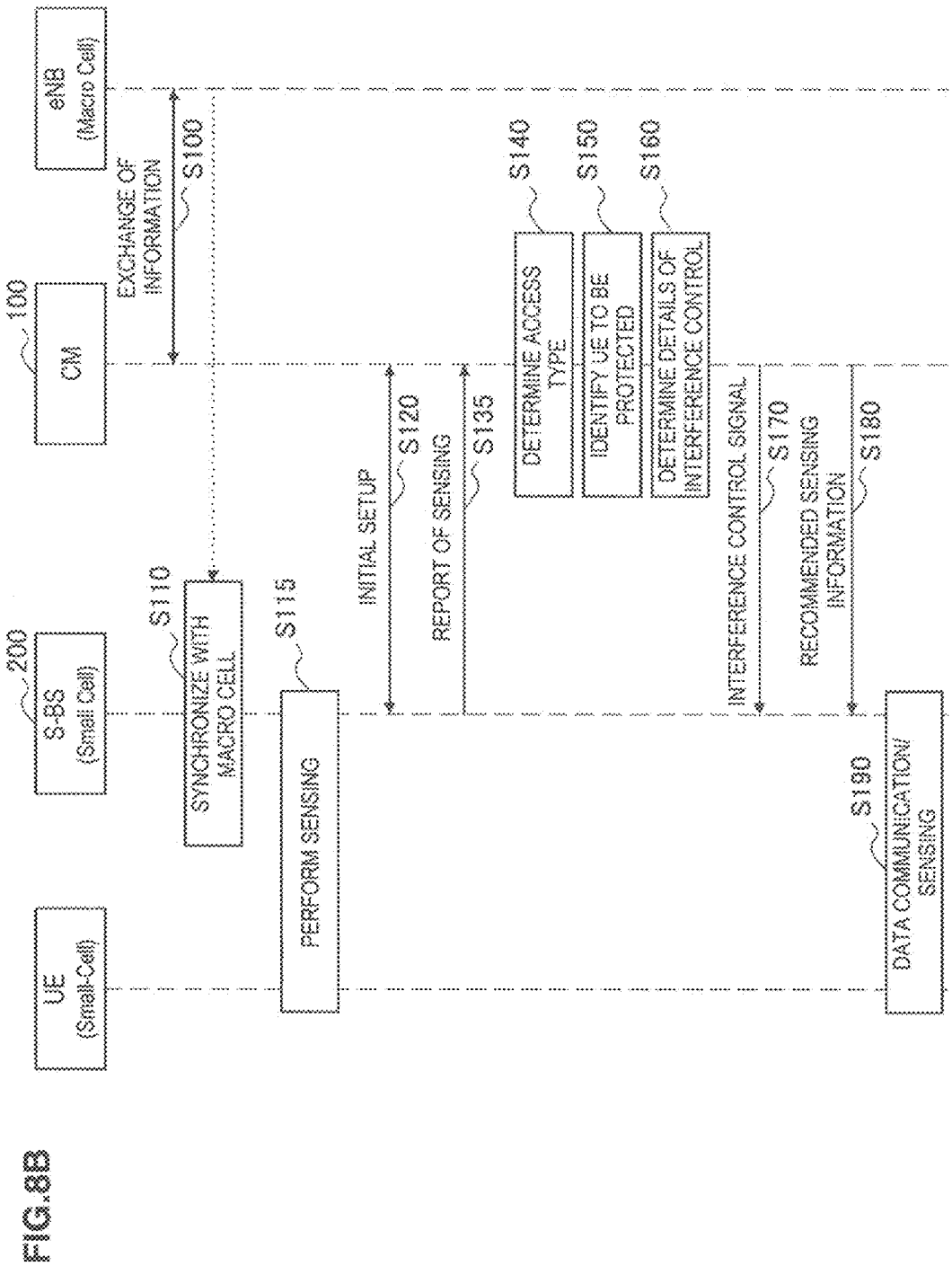
FIG. 8B is a sequence diagram showing a second example general flow of a communication control process according to one embodiment.

FIG. 8B is a sequence diagram showing a second example general flow of a communication control process according to this embodiment.

Initially, the cooperation manager 100 exchanges information with one or more macro cell base stations periodically or as requested (step S100). Here, the exchanged information may include scheduling information of a macro cell.

Next, when the small cell base station 200 is installed in any macro cell, the small cell base station 200 detects a synchronization channel from a macro cell base station, and synchronizes with the macro cell (step S110). Thereafter, the small cell base station 200 (and a small cell terminal) performs sensing on an uplink signal from a user terminal around a small cell (step S115). Here, if an uplink signal exceeding a predetermined signal level is detected, the small cell base station 200 recognizes the necessity of an interference control.

Next, an initial setup procedure is performed between the small cell base station 200 and the cooperation manager 100 (step S120). In the initial setup procedure, the setting unit 242 of the small cell base station 200 transmits small cell-related information which may include access type information to the cooperation manager 100. Also, the measurement unit 244 of the small cell base station 200 reports the result of the sensing to the cooperation manager 100 (step S135).

The subsequent process is similar to that of the first example of FIG. 8A and will not be described. Note that, in any of the first and second examples, the identification of a macro cell terminal which should be protected in step S150 may be performed by a macro cell base station instead of the cooperation manager 100.

[4-2. Communication Control Process of Cooperation Manager]

FIG. 9 is a flowchart showing an example flow of the interference control process performed by the cooperation manager 100 of this embodiment.

Referring to FIG. 9, initially, the determination unit 132 determines whether the access type of a small cell operated by the small cell base station 200 is the closed access type or the open access type (step S140). Here, if the access type of the small cell is the open access type, a macro cell terminal can be handed over to the small cell at any time, and therefore, the subsequent interference control process is skipped.

If the access type of the small cell is the closed access type, the identification unit 134 obtains the result of sensing on an uplink signal, from the small cell base station 200 (step S145). Thereafter, the identification unit 134 checks the obtained sensing result against the past scheduling information of a macro cell to identify a macro cell terminal which should be protected (step S150).

Next, the interference control unit 136 determines whether or not sufficient communication opportunities can be provided to the small cell even if the scheduling by the small cell is limited in order to protect a macro cell terminal (step S160). For example, when the number of macro cell terminals which should be protected exceeds a predetermined threshold, or when the proportion of resource blocks consumed by a macro cell terminal(s) which should be protected exceeds a predetermined threshold, it may be determined that sufficient communication opportunities cannot be provided to the small cell. The interference control unit 136, when determining that sufficient communication opportunities can be provided to the small cell, transmits scheduling information indicating a resource location at which scheduling is limited to the small cell base station 200 (step S162). On the other hand, the interference control unit 136, when determining that sufficient communication opportunities cannot be provided to the small cell, requests the small cell base station 200 to accept a handover of a macro cell terminal (step S164).

[4-3. Example of Control Result]

FIG. 10 is a diagram for describing an example result of the process described in this section which is performed after the situation illustrated in FIG. 1. Referring to FIG. 10, small cells 14a, 14b, and 14c which are operated by small cell base stations 16a, 16b, and 16c, respectively, are shown again. Here, it is assumed that the access types of the small cells 14a and 14c are the closed access type, and the access type of the small cell 14b is the open access type. A closed circle in FIG. 10 is a macro cell terminal which is protected by a resource separation scheme.

For the small cell 14a, the macro cell terminal 12a is identified as a terminal which should be protected. Therefore, the small cell base station 16a allocates radio resources different from those allocated to the macro cell terminal 12a to a small cell terminal in the small cell 14a. As a result, there is not a macro cell terminal which suffers from interference exceeding the allowable level from the small cell 14a.

For the small cell 14b, the terminals 12b and 12c which are connected to a macro cell in the example of FIG. 1 is handed over to the small cell 14b. Also, the transmission power of the small cell base station 16B increases rather than decreases, and the coverage of the small cell 14b slightly expands. As a result, there is not a macro cell terminal which suffers from interference exceeding the allowable level from the small cell 14b.

For the small cell 14c, the terminals 12e and 12f which are connected to a macro cell in the example of FIG. 1 are handed over to the small cell 14c. This is because the small cell base station 16c approves a handover acceptance request from the cooperation manager 100. On the other hand, the macro cell terminals 12d and 12g are identified as a terminal which should be protected. Therefore, the small cell base station 16c allocates radio resources different from those allocated to the macro cell terminal 12d or 12g to a small cell terminal in the small cell 14c. As a result, there is not a macro cell terminal which suffers from interference exceeding the allowable level from the small cell 14c.

Such an interference control can effectively reduce interference between a macro cell and a small cell without impairing the overall communication capacity of the system.

5. Summary

In the foregoing, embodiments of the technology of the present disclosure have been described in detail with reference to FIGS. 1 to 10. According to the above embodiments, a cooperation manager determines the access type of a small cell. Thereafter, when the access type is the closed access type, a macro cell terminal which is likely to suffer from interference caused by a radio signal from a small cell is identified, and the interference on the identified macro cell terminal is reduced by a small cell base station. Thus, by limiting a small cell on which the interference control is to be performed based on the access type, an unnecessary reduction in the communication capacity of a small cell as a result of the interference control can be avoided.

Also, according to the above embodiments, a macro cell terminal which should be protected is identified by checking the result of sensing on an uplink signal from a user terminal around a small cell against scheduling information of a macro cell. With such a technique, even if a cooperation manager and a small cell base station have not detected the location of each terminal, a macro cell terminal which should be protected can be appropriately identified. In this case, it is not necessary to signal location data or calculate a parameter, such as a distance etc., in order to identify a macro cell terminal which should be protected, and therefore, an overhead for the interference control process is reduced, resulting in a reduction in the load on the system.

Also, according to the above embodiments, even if a small cell is of the closed access type, connection of the small cell to a new terminal may be accepted, depending on the number of macro cell terminals which should be protected or the proportion of radio resources used by the terminals. Therefore, by positively utilizing the functionality of a small cell supplemental to a macro cell, the overall communication capacity of the system can be maintained while substantially reducing adverse interference.

Also, according to the above embodiments, resource locations at which continual sensing should be performed in a small cell are narrowed based on information which is sent from a cooperation manager. Therefore, the communication capacity of a small cell can be prevented from decreasing due to execution of sensing.

Note that a series of control processes performed by the devices described herein may be implemented using any of software, hardware, and a combination of software and hardware. A program included in software is, for example, previously stored in each device or a storage medium externally provided. Thereafter, each program is, for example, read into a RAM during execution, and executed by a processor, such as a CPU etc.

The preferred embodiments of the present invention have been described above with reference to the accompanying drawings, whilst the present invention is not limited to the above examples, of course. A person skilled in the art may find various alterations and modifications within the scope of the appended claims, and it should be understood that they will naturally come under the technical scope of the present invention.

Additionally, the present technology may also be configured as below.

(1) A communication control device including:
a determination unit which determines whether an access type of a small cell which at least partially overlaps a macro cell of a radio communication system is a closed access type or an open access type;
an identification unit which, when it is determined that the access type of the small cell is the closed access type, identifies a user terminal of the macro cell which should be protected from interference caused by a radio signal from the small cell; and
an interference control unit which transmits an interference control signal to a base station of the small cell so that the interference on the user terminal identified by the identification unit is reduced.

(2) The communication control device according to (1), wherein
the identification unit identifies the user terminal of the macro cell which should be protected, based on a result of sensing received from the base station of the small cell, the result of sensing being related to an uplink signal from a user terminal around the small cell.

(3) The communication control device according to (1) or (2), wherein
the interference control unit transmits scheduling information of the macro cell to the base station of the small cell so that radio resources different from radio resources allocated to the user terminal which should be protected are used in the small cell.

(4) The communication control device according to any one of (1) to (3), wherein
the interference control unit requests the base station of the small cell to accept connection to the small cell of at least one user terminal, depending on a number of user terminals which should be protected or a proportion of radio resources used by the user terminals.

(5) The communication control device according to (2), wherein
the interference control unit informs the base station of the small cell of a resource location to which the user terminal which should be protected transmits the uplink signal.

(6) The communication control device according to (5), wherein
the uplink signal includes an acknowledge signal with respect to a downlink signal.

(7) The communication control device according to (5), wherein
the uplink signal includes an authentication signal which is used when the user terminal which should be protected utilizes a broadcast service.

(8) The communication control device according to (2), wherein
the identification unit checks scheduling information of the macro cell against the result of sensing to identify the user terminal of the macro cell which should be protected.

(9) A communication control method including:
determining whether an access type of a small cell which at least partially overlaps a macro cell of a radio communication system is a closed access type or an open access type;
when it is determined that the access type of the small cell is the closed access type, identifying a user terminal of the macro cell which should be protected from interference caused by a radio signal from the small cell; and
transmitting an interference control signal to a base station of the small cell so that the interference on the identified user terminal is reduced.

(10) A base station of a small cell of a closed access type, the base station including:
a control unit which
when the small cell at least partially overlaps a macro cell of a radio communication system, informs a control node which controls interference between the macro cell and the small cell that an access type of the base station is the closed access type, and
controls communication in the small cell in accordance with an interference control signal transmitted from the control node in response to the informing to reduce interference on a user terminal of the macro cell which should be protected from interference caused by a radio signal from the small cell.

(11) A communication control method performed by a base station of a small cell of a closed access type, the method including:
when the small cell at least partially overlaps a macro cell of a radio communication system, informing a control node which controls interference between the macro cell and the small cell that an access type of the base station is the closed access type, and
controlling communication in the small cell in accordance with an interference control signal transmitted from the control node in response to the informing to reduce interference on a user terminal of the macro cell which should be protected from interference caused by a radio signal from the small cell.

REFERENCE SIGNS LIST 10 macro cell
11 macro cell base station
14a to 14c small cell
16a to 16c small cell base station
100 cooperation manager (communication control device)
132 determination unit
134 identification unit
136 interference control unit
200 small cell base station

The invention claimed is:

1. A first communication device, comprising:
a central processing unit (CPU) configured to:
receive resource information for a second communication device,
wherein the second communication device communicates with a first user terminal by a radio resource indicated by the resource information,
wherein communication between the first user terminal and a third communication device is barred; and
transmit, based on the resource information, a signal to the third communication device.

2. The first communication device according to claim 1, wherein the resource information is based on a measurement result reported from the first user terminal.

3. The first communication device according to claim 1, wherein the radio resource indicated by the resource information corresponds to an interference resource from the second communication device to the first user terminal.

4. The first communication device according to claim 1, wherein the CPU is further configured to:
receive, information related to the third communication device including access type information, from the third communication device.

5. The first communication device according to claim 4, wherein the access type information indicating an access type of the third communication device refers to categories of acceptance of access from a second user terminal.

6. The first communication device according to claim 5, wherein the access type includes an open access type or a closed access type,
wherein every user terminal is allowed to connect to the third communication device of the open access type, and
wherein limited user terminals are allowed to connect to the third communication device of the closed access type.

7. The first communication device according to claim 1, wherein the CPU is further configured to receive a result of sensing from the third communication device.

8. The first communication device according to claim 7, wherein the result of sensing is related to a measurement of an uplink signal from a second user terminal.

9. A first communication device, comprising:
a central processing unit (CPU) configured to:
determine that an access type of a second communication device is a closed access type;
identify a first user terminal to be protected from interference caused by a radio signal from the second communication device of the closed access type based on a result of sensing received from a second user terminal,
wherein the first user terminal is communicatively coupled to a third communication device; and
inform the second communication device of radio resources which at least one of the second communication device or the first user terminal uses to transmit a signal.

10. The first communication device according to claim 9, wherein the result of sensing is related to a measurement of an uplink signal from the second user terminal.

11. The first communication device according to claim 9,
wherein every user terminal is allowed to communicatively couple to the second communication device of an open access type, and
wherein limited user terminals are allowed to communicatively couple to the second communication device of the closed access type.

12. A method for communication, comprising:
receiving by a first communication device, a resource information for a second communication device,
wherein the second communication device communicates with a first user terminal using a radio resource indicated by the resource information,
wherein the first user terminal is barred from communicating with a third communication device; and
transmitting by the first communication device, based on the resource information, a signal to the third communication device.

13. A first communication device, comprising:
a central processing unit (CPU) configured to:
report a result of sensing of a first user terminal to a second communication device,
wherein the second communication device identifies a second user terminal to be protected from interference caused by a radio signal from the first communication device based on the result of sensing of the first user terminal,
wherein communication between the first communication device and the second user terminal is barred; and
allocate radio resources, other than the radio resources allocated to the second user terminal, to the first user terminal based on a control signal received from the second communication device.

14. The first communication device according to claim 13, wherein the result of sensing is related to a measurement of an uplink signal from the first user terminal.

* * * * *